G. W. RIVERS.
HULLER.
APPLICATION FILED AUG. 18, 1917.

1,263,601.

Patented Apr. 23, 1918.

Inventor
GEORGE W. RIVERS
By Watson E. Coleman
Attorney

UNITED STATES PATENT OFFICE.

GEORGE W. RIVERS, OF ABERDEEN, NORTH CAROLINA, ASSIGNOR TO CHARLES N. BRASINGTON, OF BENNETTSVILLE, SOUTH CAROLINA.

HULLER.

1,263,601.   Specification of Letters Patent.   Patented Apr. 23, 1918.

Application filed August 18, 1917. Serial No. 186,892.

*To all whom it may concern:*

Be it known that I, GEORGE W. RIVERS, a citizen of the United States, residing at Aberdeen, in the county of Moore and State of North Carolina, have invented certain new and useful Improvements in Hullers, of which the following is a specification, reference being had to the accompanying drawings.

This invention relates to certain improvements in hullers and has relation more particularly to a device of this general character especially designed and adapted for use in connection with peas and beans; and it is an object of the invention to provide a device of this general character with a novel and improved concave whereby the peas or beans are prevented from being split by the teeth of the cylinder coacting with the concave.

The invention consists in the details of construction and in the combination and arrangement of the several parts of my improved huller whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
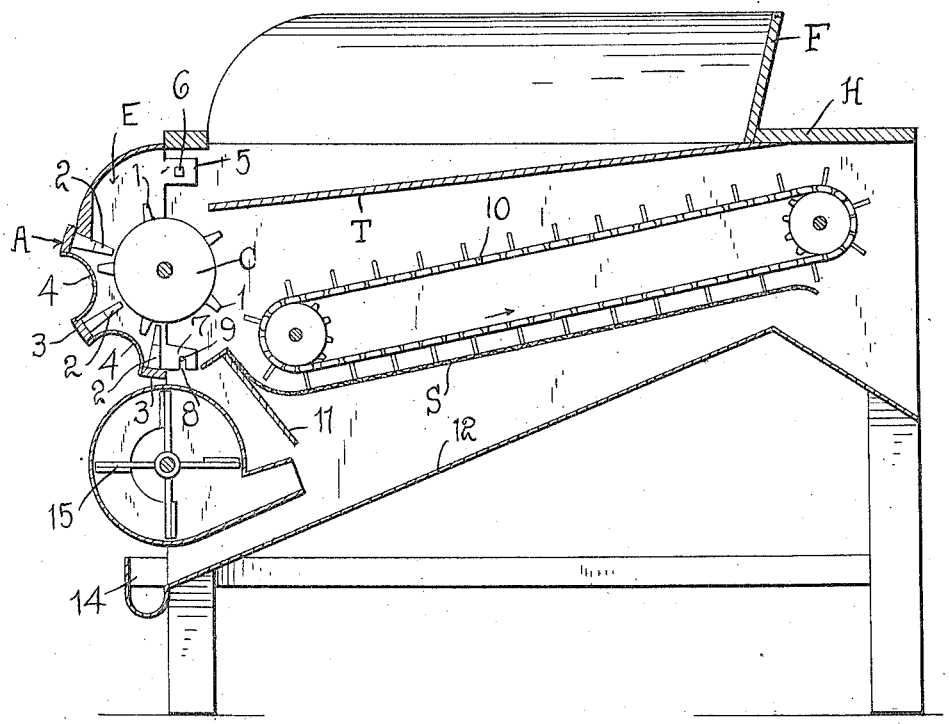
Figure 2:
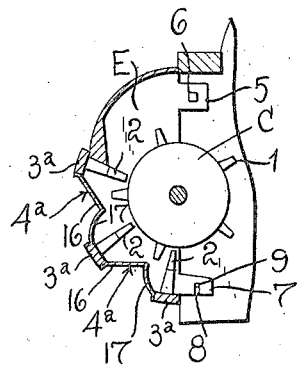

Figure 1 is a vertical sectional view taken through a huller constructed in accordance with an embodiment of my invention with certain of the parts in elevation; and Fig. 2 is a fragmentary view partly in elevation and partly in section illustrating a concave constructed in accordance with a further embodiment of my invention.

As disclosed in the accompanying drawings, H denotes a suitably supported housing provided at its top with the feed hopper F delivering upon the table or feed-way T. The table or feed-way T serves to deliver the pods of peas or beans to the cylinder C adapted to be driven in any desired manner and from which radiate the teeth 1 and which coact with the teeth 2 extending inwardly on predetermined angles from the concave A.

As herein embodied, the concave A includes the strips 3 disposed longitudinally of the cylinder C and with which the teeth 2 are directly engaged and interposed between the strips 3 are the inwardly directed plates 4 preferably circular in cross section as illustrated in Fig. 1 and which closely approach the outer extremities of the teeth 1 as the same pass thereby. The intermediate portions or plates 4 have been found to effectively prevent the teeth 1 from splitting the peas or beans as the shelled or partly shelled peas or beans are caused to fall back upon the cylinder and therefore do not roll over the strips 3. Should the shelled or partly shelled peas or beans roll over the strips 3 the ends of the teeth 1 would have a tendency to crush the same. It is therefore self-evident that this material disadvantage is effectively overcome by the present invention.

Each end E of the concave A is provided in its upper portion with the extension 5 which is bolted or otherwise secured, as at 6, to the inner wall of the housing H, while the lower portion of the concave A is provided with an extension 7 provided in its lower margin with the notch or recess 8 adapted to receive the inwardly directed pin 9 also carried by the housing H, as is thought to be clearly illustrated in Fig. 1 of the drawings.

The cylinder C discharges the peas or beans upon the screening element S and the same are carried rearwardly thereof through the medium of the carrier 10 adapted to be operated in any desired manner. The peas or beans falling through the screening element S drop upon the boards or aprons 11 and 12 so that said peas or beans are conveyed to the spout 14 of any conventional type.

15 denotes a fan adapted to direct a blast of air between the screening element S and the board or apron 12 in order to free the peas or beans of any particles of dust or other foreign matter passing through the element S in a manner which is believed to be clearly apparent to those skilled in the art to which my present invention appertains.

In the form of invention illustrated in Fig. 2, the parts disclosed are substantially the same as has hereinbefore been set forth with the exception of the plates or portions 4ᵃ interposed between the strips 3ᵃ. As disclosed in this embodiment of my invention, it is to be noted that the upper portion 16 of each of the plates 4ᵃ is disposed inwardly on a predetermined incline with its lower portion 17 disposed on a predetermined outward curvature.

From the foregoing description, it is thought to be obvious that a huller constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a huller including a cylinder provided with teeth radiating therefrom, a concave coacting with the cylinder, said concave being provided with teeth disposed in a direction toward the cylinder, the portions of the concave intermediate the teeth being disposed inwardly in a direction toward the cylinder and beyond the plane occupied by the base portions of adjacent teeth.

2. The combination, in a huller, of a cylinder provided with teeth radiating therefrom and a concave coacting with the cylinder, said concave including strips disposed longitudinally of the cylinder and provided with teeth disposed in a direction toward the cylinder, and plates interposed between the strips, said plates extending in cross section in a direction toward the cylinder and beyond the plane occupied by adjacent strips.

3. The combination, in a huller, of a cylinder provided with teeth radiating therefrom and a concave coacting with the cylinder, said concave including strips disposed longitudinally of the cylinder and provided with teeth disposed in a direction toward the cylinder, and plates interposed between the strips, said plates extending in cross section in a direction toward the cylinder and beyond the plane occupied by adjacent strips, a longitudinal marginal portion of each of the plates being concave in cross section.

4. The combination, in a huller, of a cylinder provided with teeth radiating therefrom and a concave coacting with the cylinder, said concave including strips disposed longitudinally of the cylinder and provided with teeth disposed in a direction toward the cylinder, and plates interposed between the strips, said plates extending in cross section in a direction toward the cylinder and beyond the plane occupied by adjacent strips, a longitudinal marginal portion of each of the plates being concave in cross section, the opposite longitudinal marginal portion of the plate being inclined in cross section.

In testimony whereof I hereunto affix my signature.

GEORGE W. RIVERS.

Copies of this patent may be obtained for five cents each, by addressing the "Commissioner of Patents, Washington, D. C."